C. J. PLAN & W. H. DORLAND.
COMBINED END GATE AND STEP.
APPLICATION FILED APR. 21, 1908.
932,320.
Patented Aug. 24, 1909.
2 SHEETS—SHEET 1.
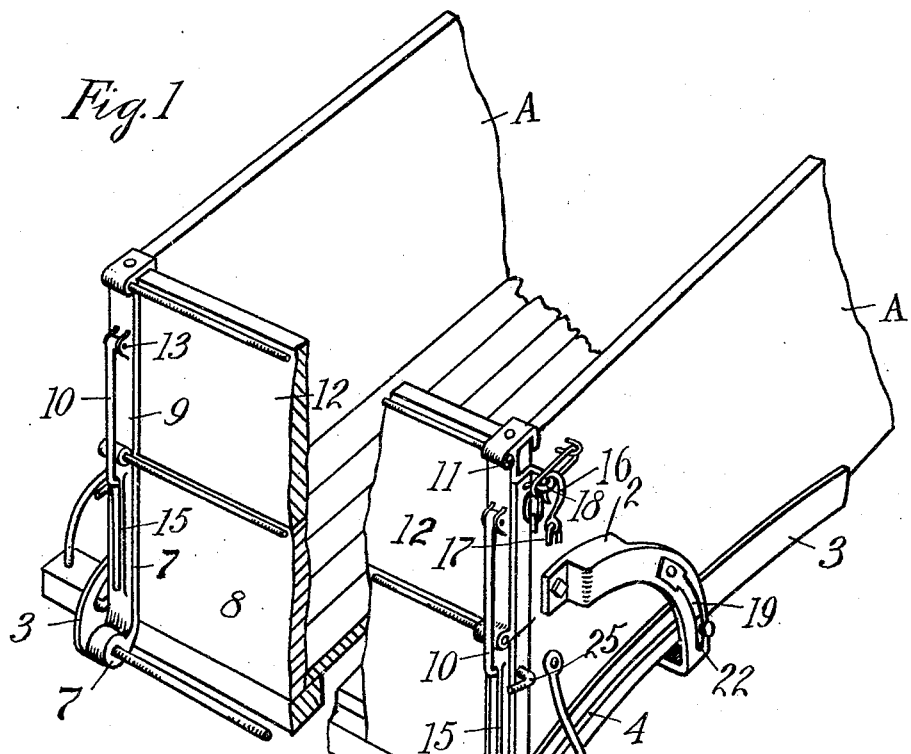
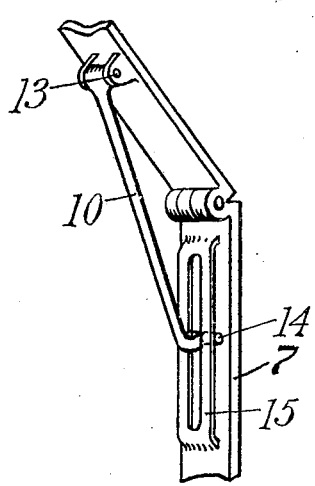
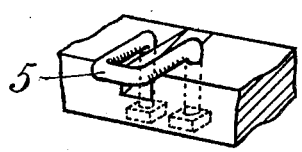
Witnesses,
George Voelker
Hattie Smith
Inventors,
Charles J. Plan
Walter H. Dorland
by Lothrop Johnson
their Attorneys

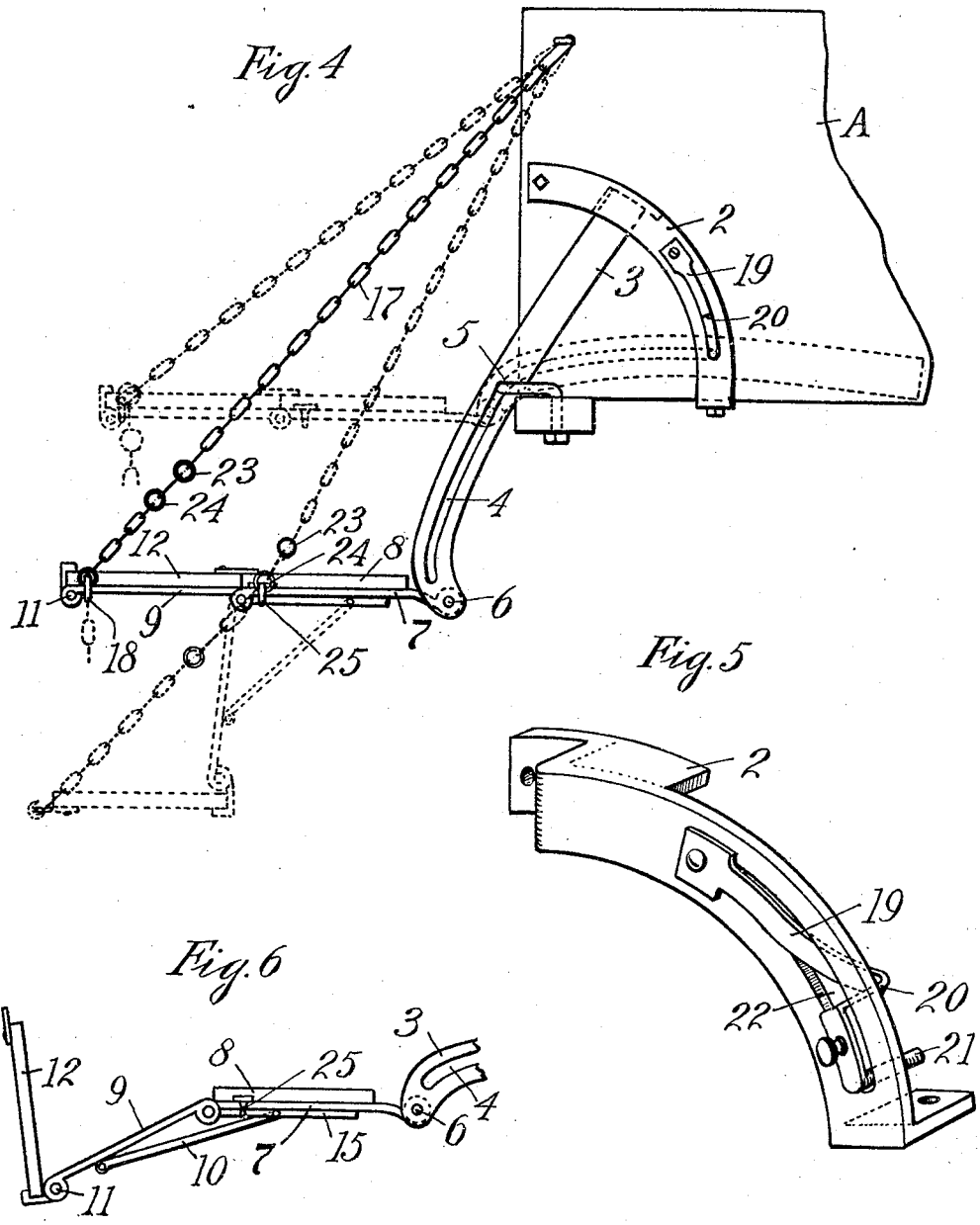

UNITED STATES PATENT OFFICE.

CHARLES J. PLAN AND WALTER H. DORLAND, OF INVER GROVE, MINNESOTA.

COMBINED END-GATE AND STEP.

932,320.　　　　　　　Specification of Letters Patent.　　Patented Aug. 24, 1909.

Application filed April 21, 1908. Serial No. 428,445.

*To all whom it may concern:*

Be it known that we, CHARLES J. PLAN and WALTER H. DORLAND, citizens of the United States, residing at Inver Grove, in the county of Dakota and State of Minnesota, have invented certain new and useful Improvements in Combined End-Gates and Steps, of which the following is a specification.

Our invention relates to improvements in combined end gates and steps for wagons, its object being particularly to provide an end gate which may be easily and quickly transformed into a series of steps for the rear of the wagon to assist in unloading, etc.

To this end our invention consists in the features of construction and combination hereinafter particularly described and claimed.

In the accompanying drawings forming part of this specification, Figure 1 is a perspective view of the rear end of a wagon fitted with our improvements and showing the same in use as an end gate; Fig. 2 is a detail view of a supporting staple forming part of our invention; Fig. 3 is a detail of a connecting hinge for the sections of the gate; Fig. 4 is a side elevation of the rear end of a box fitted with our invention and showing the gate arranged as steps; Fig. 5 is a perspective view of a guide strap forming part of our invention, and Fig. 6 is a side or edge view of the gate members and a portion of the extension bars which carry them.

In the drawings A represents the side walls of the wagon box. Upon each side wall near its rear end is secured a curved guide strap 2 extending out from the side wall a sufficient distance to permit the slotted extension bar 3 to work freely within it. The extension bars 3 are formed with longitudinally extending slots 4 and are slidably supported upon the wagon body by means of a staple or pin 5 passing through the slot and secured in the wagon body. Thus it will be seen that the extension bars may be drawn endwise from the wagon until the pin 5 abuts against the other end of the slot. The extension bars are slightly curved in shape particularly at their outer ends so that when extended they will not project too far beyond the wagon body.

The outer ends of the extension bars are connected by a rod 6 to which is hinged, as by means of the hinge straps 7 the inner or lower plank 8 of the end gate. Hinged to the outer ends of the straps 7 are the straps 9 the opposite ends of the straps being hinged at 11 to the outer edge of the outer plank 12 of the end gate.

In order to hold the planks 8 and 12 in the lower dotted line position shown in Fig. 4, as hereinafter described, we provide the arms 10 having hinge connection 13 upon the outer straps 9 and each having a cross arm 14 slidable in a slotted guide 15 upon the corresponding strap 7.

When the planks are used as an end gate the plank 12 will be folded over upon the straps 9 and then both planks will be folded up upon the rod 6 against the wagon box as shown in Fig. 1 and may be secured in this position by passing the end hooks 16 of the chains 17 through the eyes 18 upon the sides of the plank 12. The extension bars 3 will at the same time be pushed in until the pins or staples 5 lodge in the outer ends of the slots 4 adjacent to the rod 6. The extension bars are held in this position by means of the spring clips 19 each having a bend 20 and an inturned lower end or pin 21 normally sprung within a slot 22 in the guide bar 2, the bend 20 entering the slot above the upper edge of the extension bar 3 and the inturned end or pin 21 entering the slot 4 in the extension bar. The gate may be turned down like any other gate into position flush with the wagon box by turning both planks 8 and 12 downwardly upon the hinge 6 as indicated by the upper dotted lines in Fig. 4, in which position they may be held by means of a chain 17 secured to the wagon box and interlocking by means of one of its links 23 with the eye 18.

If it is desired to lower the end gate planks still farther, while at the same time keeping them in alinement, the clip 19 is lifted out of the slot 22 so as to free the extension bars. The extension bars are then slid out upon the pin 5 until the pin reaches the inner end of the slot as shown in full lines in Fig. 4. The inner ends of the extension bars will move circularly up in the guide straps 2 until they abut against the closed upper ends thereof. To hold the members in this position it is only necessary to provide a longer chain.

When it is desired to convert the end gate into two steps one below the other it is only necessary to unfold the outer plank 12 upon its hinges 11 and turn the straps 9 down upon their hinge connection upon the lower plank 8. The straps 9 will then be turned down into vertical position as shown in dotted lines in Fig. 4, their further turning being checked by means of the arms 10. The planks 8 and 12 will be supported in horizontal position by means of the chain, which, for that purpose, may be provided with an extra link 24 to engage with the hook 25 upon the side of the plank 8 near its outer end, the end hook 16 engaging with the eye at the free end of the plank 12. The chain may be made of any desired number of hooks or links suitably spaced for supporting the steps.

We claim:

1. The combination with a wagon box, of an end gate comprising hinged sections, an extensible hinge connection between said sections, and means for supporting the outer sides of said sections from the wagon box.

2. The combination with a wagon box, of an end gate comprising hinged sections, slidable extension bars connecting the inner side of the inner section with the wagon box, and means for adjustably supporting the outer sides of said hinged sections from the wagon box.

3. The combination with a wagon box, of an end gate comprising hinged sections, bars slidably connecting the inner side of the inner section with the wagon box, an extension hinge between the sections, and means for supporting the outer edges of said sections in step formation from the wagon box.

4. The combination with a wagon box, of an end gate comprising hinged sections, bars slidably supporting the inner side of the inner section from the wagon box, a hinge connecting the outer edge of the inner section with the outer edge of the outer section, and means for supporting the outer sides of said sections in step formation from the wagon box.

5. The combination with a wagon box, of an end gate comprising hinged sections, slidable hinged bars connecting the inner edge of the inner section with the wagon box, hinges connecting the outer edge of the inner section with the outer edge of the outer section to allow said outer section to be turned away from said inner section in step formation, supporting brace arms arranged to hold said outer section in step formation, and chains connecting the outer edges of said sections with the wagon box.

6. The combination with a wagon box, of an end gate comprising hinged sections, hinged bars slidably connecting the inner edge of the inner section with the wagon box, hinges connecting the outer edge of the inner section with the outer edge of the adjacent section, brace arms connecting the leaves of said hinges to hold them at right angles, and an adjustable chain connection between the outer edges of said sections and the wagon box.

7. The combination with a wagon box, of an end gate comprising hinged sections, hinged arms slidably connecting the inner edge of the inner section with the wagon box, hinges connecting the outer edge of the inner section with the outer edge of the adjacent section, brace arms connecting the leaves of said hinges to hold them at right angles, an adjustable chain connection between the outer edges of said sections and the wagon box, and means for locking said hinged arms in indrawn position.

In testimony whereof we affix our signatures in presence of two witnesses.

CHARLES J. PLAN.
WALTER H. DORLAND.

Witnesses:
 ARTHUR P. LOTHROP,
 HATTIE SMITH.